United States Patent
Burk

(10) Patent No.: US 10,408,357 B2
(45) Date of Patent: Sep. 10, 2019

(54) VALVE FOR AN ADSORPTION HEAT PUMP AND USE OF THE VALVE IN AN ADSORPTION HEAT PUMP

(71) Applicant: Mahle International GmbH, Stuttgart (DE)

(72) Inventor: Roland Burk, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/565,145

(22) PCT Filed: Mar. 31, 2016

(86) PCT No.: PCT/EP2016/057061
§ 371 (c)(1),
(2) Date: Oct. 6, 2017

(87) PCT Pub. No.: WO2016/162258
PCT Pub. Date: Oct. 13, 2016

(65) Prior Publication Data
US 2018/0100592 A1    Apr. 12, 2018

(30) Foreign Application Priority Data
Apr. 8, 2015 (DE) .................. 10 2015 206 269

(51) Int. Cl.
*F16K 11/044*     (2006.01)
*F25B 17/08*      (2006.01)
(Continued)

(52) U.S. Cl.
CPC ........... *F16K 11/044* (2013.01); *F25B 17/083* (2013.01); *F25B 30/04* (2013.01); *F25B 41/04* (2013.01); *Y10T 137/86501* (2015.04)

(58) Field of Classification Search
CPC ........ F16K 11/044; F25B 17/08; F25B 17/03; F25B 30/04; F25B 41/04; Y02B 30/64; Y02A 30/278; Y10T 137/86501
See application file for complete search history.

(56) References Cited

U.S. PATENT DOCUMENTS 6,706,438 B2 *  3/2004  Sahoda .................. F04F 5/461
                                                       137/111
7,251,955 B2    8/2007  Henning
(Continued)

FOREIGN PATENT DOCUMENTS

DE         10217443 B4    7/2004
DE      102009036545 A1    2/2011
(Continued)

OTHER PUBLICATIONS

English abstract for DE-102009036545.
(Continued)

*Primary Examiner* — Eric Keasel
*Assistant Examiner* — Kevin R Barss
(74) *Attorney, Agent, or Firm* — Fishman Stewart PLLC

(57) ABSTRACT

A valve for an adsorption heat pump may be adjustable between a closed position, a first open position, a second open position, and at least one intermediate position. The valve may include a first channel, a second channel, a third channel, a first valve unit, a second valve unit, and a spring element providing a closing force upon the first valve body and the second valve body. The valve may also include an actuating drive configured to hold the valve in position without power. The actuating drive may include a stepping motor and a gear unit constructed and arranged to hold the valve in position via a currentless holding moment. The first valve unit and the second valve unit may have a valve opening characteristic of a flow coefficient dependent on an (Continued)

adjustment path that is not linear. The valve opening characteristic may include at least one flat region.

20 Claims, 5 Drawing Sheets

(51) Int. Cl.
    *F25B 30/04*     (2006.01)
    *F25B 41/04*     (2006.01)

(56) References Cited

U.S. PATENT DOCUMENTS

| | | | |
|---|---|---|---|
| 9,618,243 B2 | 4/2017 | Burk et al. | |
| 2008/0142100 A1* | 6/2008 | Spickard | F02C 7/232 137/625.6 |
| 2016/0290326 A1* | 10/2016 | Sugamura | F04B 27/1804 |

FOREIGN PATENT DOCUMENTS

| | | | |
|---|---|---|---|
| DE | 102011003664 A1 | | 8/2012 |
| DE | 102014211703 A1 | | 12/2014 |
| JP | 2005-03190 | * | 1/2005 |
| JP | 2005-3190 A | | 1/2005 |
| JP | 2010-038336 A | * | 2/2010 |
| JP | 2012-225438 A | | 11/2012 |
| WO | WO-2006092401 A1 | | 9/2006 |
| WO | WO-2012108140 A1 | | 8/2012 |
| WO | WO-2013022867 A1 | | 2/2013 |

OTHER PUBLICATIONS

English abstract for DE-102011003664.
English abstract for JP-2005-3190.
English abstract for JP-2010-038336.
English abstract for JP-2012-225438.

* cited by examiner

VALVE FOR AN ADSORPTION HEAT PUMP AND USE OF THE VALVE IN AN ADSORPTION HEAT PUMP

CROSS-REFERENCE TO RELATED APPLICATIONS

This application claims priority to International Patent Application No.: PCT/EP2016/057061 filed on Mar. 31, 2016, and German Patent Application No.: DE 10 2015 206 269.4 filed on Apr. 8, 2015, the contents of which are incorporated herein by reference.

TECHNICAL FIELD

The invention relates to a valve for an adsorption heat pump with a first channel, a second channel, a third channel, a first valve unit, which opens and closes the first channel, and comprises a first valve body and a first valve seat, with a second valve unit, which opens and closes the second channel and comprises a second valve body and a second valve seat. The invention further relates to the use of such a valve in an adsorption heat pump.

Heat pumps are generally operated with a fluid which vaporizes at low pressure with heat input, in order to condense again after compression to a higher pressure with heat emission. Thereby, through mechanical work in the form of pressure changes, heat can be transferred from the vaporization zone to the condensation zone. In adsorption heat pumps, the pressure differences are achieved in that an adsorption means adsorbs the fluid at a low pressure and desorbs it at a higher pressure. During desorbing, heat is supplied to the adsorption means at a high temperature level and during adsorbing heat is removed from the adsorption means at a lower temperature level. Thereby, the pressure differences required for the heat pump can be achieved by heating and cooling the adsorption means. Therefore, no mechanical energy, but rather thermal energy is used, in order to operate the heat pump. This process can not be carried out continuously, because the adsorption means is generally a solid, which must remain in situ. For this reason, adsorption heat pumps are operated discontinuously and alternate cyclically between adsorption and desorption.

Here, the sorption zone is temperature-controlled in an alternating manner by means of a high temperature heat carrier and by means of a medium temperature heat carrier, so that the adsorption means alternates in the sorption zone between adsorption and desorption. For switching over between adsorption and desorption, it is known from the prior art to use rotary valves. Such rotary valves are known for example from DE 10 2009 036 545 A1 and DE 10 2014 211 703 A1. However, such rotary valves have the disadvantage that a scaling of the adsorption heat pump is not possible, because the rotary valves are designed for a fixed number of sorption modules.

From DE 10 2011 003 664 A1 an adsorption heat pump is known, which has independent valves, in order to switch over between the high temperature heat carrier and the medium temperature heat carrier. In this configuration, the possibility of recovering heat which was used during the heating of the sorption zone is very greatly restricted.

From JP 2005 003190 A three-way valve is known for mixing or dividing liquids. The valve has two valve bodies, which are acted upon by a spring element, which is arranged between the two valve bodies, with a spring force in the direction of a respective closure position of the valve bodies. In addition, the valve has an actuating drive with a control rod, which engages through the two valve bodies. Carriers for the valve bodies are arranged on the control rod, with which carriers the valve bodies can be moved, in order to control the respective through-flow. Corresponding valves are also known from JP 2010 038336 A, WO 2006/092401 A1 and WO 2012/108140 A1.

SUMMARY

The present invention is based on the problem of improving the flexibility and the efficiency of an adsorption heat pump.

This problem is solved according to the invention by the independent claims. Advantageous further developments are the subject of the dependent claims.

The invention is based on the general idea of using valves for the adsorption heat pump which not only switch over digitally between two states, but can also assume intermediate positions, which provide a throttled connection. Thereby, on a changeover between the desorption phase and the adsorption phase or vice versa, the respective heat carrier can firstly be directed in a throttled manner through the sorption zone, so that in a similar manner to as in a heat exchanger, a majority of the heat can be recovered from the sorption module and transferred to the through-flowing heat carrier. It is expedient that the valve has a closure position, in which a first valve unit and a second valve unit are closed, that the valve has a first open position, in which the first valve unit is fully open, that the valve has a second open position, in which the second valve unit is fully open, that the valve has at least one intermediate position, in which one of the two valve units is partially open, and that the valve is designed such that the actuating drive can hold the valve in the closed position, in the open positions and in the at least one intermediate position without power. Thereby, the connection of the sorption module to the high temperature heat carrier and to the medium temperature heat carrier can not only be switched to and fro, but also through the intermediate positions a throttled connection can be produced. Furthermore, also both connections to the sorption module can be closed. This enables a very flexible control of the adsorption heat pump, so that the efficiency of the adsorption heat pump can be improved. In particular, a high proportion of sensitive heat can be recovered from the sorption modules. Furthermore, the high sorption outputs occurring on the changeover between adsorption and desorption phase can be reduced or respectively adapted, in order to prevent negative effects with outputs which are too high. In addition, through the fact that the valve can hold the individual positions without power, the energy consumption which is required for operating the valves can be reduced, so that overall the efficiency of the adsorption heat pump can be improved.

In the description and the enclosed claims, "fully open" is understood to mean that a valve is open as far as the geometric characteristics of the valve permit. In particular, that the greatest possible effective flow cross-section of the valve is achieved.

In the description and the enclosed claims, "without power" is understood to mean that no power is supplied to the valve. For example the valve can hold a position without energy consumption. In the case of an electrically driven valve, "without power" means, accordingly, currentless, therefore that no current has to flow in order to hold the valve in a position. Therefore, no electrical power is required.

According to the invention, provision is made that the actuating drive has a stepping motor and a gear unit, wherein the stepping motor and the gear unit are designed such that a currentless holding moment is sufficient, in order to hold the valve in the positions. Stepping motors usually have, due to construction, a certain holding moment at the respective steps. Through a corresponding transmission of the gear unit, the holding moment of the actuating drive can thereby be designed such that the valve pauses in the individual positions. For this, for example, the holding moment must be great enough in order to be able to receive the closing force of the spring element and pressure-induced forces onto the valve body.

Furthermore, for example, the gear unit can be designed so as to be self-inhibiting, so that thereby a high holding moment of the actuating drive can be achieved.

A further favorable possibility makes provision that the actuating drive comprises a stepping motor-linear drive. Such a drive is particularly well-suited for such a valve, because the control rod, which influences the valve bodies, must be moved linearly.

A particularly favorable possibility makes provision that the actuating drive has centering elements, by which the control rod and preferably the valve bodies are centered. In this way, the correct movement of the individual elements can be improved. In particular, the centering of the valve bodies to the valve seats can thereby be improved, so that the sealing of the valve units is improved.

A further particularly favorable possibility makes provision that the centering elements are formed by spring lugs on the carrier elements. The carrier elements extend from the control rod radially outwards, so that a distance of the control rod to an inner wall of the valve is less than for example the distance between the control rod and the wall. Thereby, the centering elements can be configured to be smaller. Consequently, through the arrangement of the centering elements on the carrier elements, a better centering effect can be achieved.

According to the invention, provision is made that a valve opening characteristic of the valve units, which describes a flow coefficient depending on an adjustment path, is not linear. In this way, positions in which the valve units are only partially open can be widened with respect to the adjustment path, so that particular partial opening regions can be approached more precisely.

The flow coefficient is provided here by the formula:

$$k_v = Q(\rho/\Delta p)^{1/2}$$

Here, $k_v$ is the flow coefficient, Q is the effective opening cross-section, which takes into account geometric flow effects, $\rho$ is the density and $\Delta p$ is the pressure difference between inlet and outlet of the valve.

A further advantageous solution makes provision that the valve opening characteristic has a gradient which varies over the adjustment path. In this way, particular regions of the characteristic can be approached more precisely. In regions with a smaller gradient, the flow coefficient alters depending on the adjustment path less than in regions with a greater gradient. Consequently, in regions with a smaller gradient, a more precise adjustment of the flow coefficient is possible.

A particularly advantageous solution makes provision that the gradient of the valve opening characteristic becomes greater with a rising adjustment path. Thereby, small opening values of the valve units can be approached more precisely and nevertheless the overall adjustment path can thereby be reduced, because with large degrees of opening of the valve units a high accuracy is no longer necessary.

According to the invention, provision is made that the valve opening characteristic has at least one flattened region, in particular a step. This can be advantageous if a defined degree of opening or flow coefficient is to be able to be set. Thereby, a tolerance range occurs for the adjustment path, by the flow coefficient remaining approximately constant.

A favorable variant makes provision that at least one of the valve bodies has a valve surface which runs in such a way that an angle of the valve surface to an axis of the respective valve unit varies in an axial direction. On opening of the valve unit, an annular gap forms between the valve body and the valve seat. The cross-sectional area of this annular gap determines substantially the flow coefficient. The inclination, therefore the angle of the valve surface to the axis of the respective valve unit, determines the rate by which the area of the annular gap increases, depending on the adjustment path of the valve body in axial direction. Through the fact that the angle of the valve surface to the axis varies in axial direction, the dependence between the area of the annular gap and the adjustment path is therefore varied, so that thereby the valve opening characteristic of the valve units can be adjusted.

A particularly favorable variant makes provision that the first channel, the second channel and the third channel open respectively in a central chamber. Thereby, through the first valve unit, a fluidic connection between the first channel and the third channel can be controlled, and through the second valve unit a fluidic connection between the second channel and the third channel can be controlled. Thereby, for example, a sorption module connected to the third channel can be switched to and fro alternately with a high temperature heat carrier connected to the first channel and a medium temperature heat carrier connected to the second channel, or closed, so that none of the heat carriers flows through the sorption module.

In addition, the above-mentioned problem is solved by the use of such a valve in an adsorption heat pump, in order to switch over between a high temperature heat carrier and a medium temperature heat carrier.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION OF THE DRAWINGS

Figure 1:
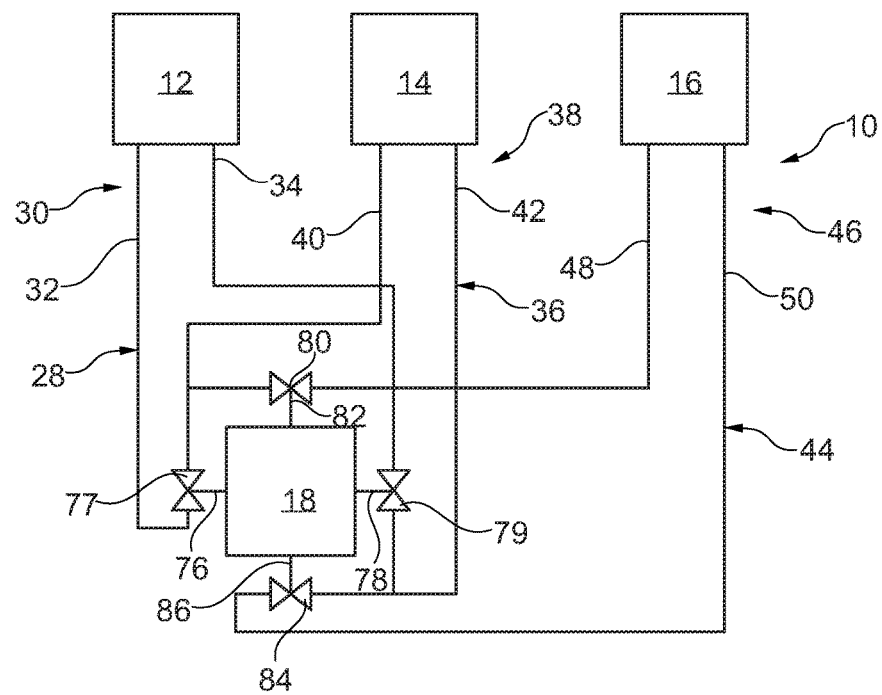
FIG. 1 illustrates a schematic diagram of an adsorption heat pump.

An adsorption heat pump 10 illustrated in FIG. 1 has a high temperature heat source 12, a medium temperature heat sink 14 and a low temperature heat source 16. In addition, the adsorption heat pump 10 has at least one, for example three, sorption modules 18. The at least one sorption module 18, illustrated by way of example in FIG. 2, comprises a sorption zone 20, which contains a sorption means 22 and is heated and cooled in alternation. In a desorption phase of the sorption zone 20, the sorption zone 20 is heated by the high temperature heat source 12 and in an adsorption phase the sorption zone 20 is cooled by the medium temperature heat sink 14. Furthermore, the sorption module 18 has a phase change zone 24, in which a working medium 26 can condense and vaporize. The sorption module 18 has a fluid connection 19 between the phase change zone 24 and the sorption zone 20, through which the working medium 26 can arrive from the phase change zone 24 to the sorption zone 20 and back.

The high temperature heat source 12 controls the temperature of a high temperature heat carrier 28, which circulates in a high temperature circuit 30. The high temperature circuit has a high temperature feed 32, in which the high temperature heat carrier 28 is directed to the at least one sorption module 18, and a high temperature return 34, via which the high temperature heat carrier 28 is returned to the high temperature heat source 12.

The high temperature heat source 12 has a temperature above the ambient temperature, preferably over 80° C., particularly preferably over 100° C., for example 110° C. The high temperature heat source 12 can represent a waste heat source from any desired energy conversion- or valued-added processes or else can obtain the thermal energy, from chemical energy, for example by combustion, or from cost-free solar energy.

The medium temperature heat sink 14 cools a medium temperature heat carrier 36, which circulates in a medium temperature circuit 38. The medium temperature circuit 38 has a medium temperature feed 40, into which the medium temperature heat carrier 36 is directed from the medium temperature heat sink 14 to the sorption module 18. Furthermore, the medium temperature circuit 38 has a medium temperature return 42, via which the medium temperature heat carrier 36 can be directed from the at least one sorption module 18 back to the medium temperature heat sink 14.

The temperature of the medium temperature heat sink 14 corresponds approximately to the ambient temperature. The temperature is actually somewhat greater than the ambient temperature, so that via a heat exchanger, thermal energy can be emitted from the medium temperature circuit 38 to the environment. For this, the medium temperature heat sink 14 has a cooler, for example a water- or air cooler.

The low temperature heat source 16 controls the temperature of a low temperature heat carrier 44, which circulates in a low temperature circuit 46. The low temperature circuit 46 has a low temperature feed 48, in which the low temperature heat carrier 44 is directed to the at least one sorption module 18. Furthermore, the low temperature circuit 46 has a low temperature return 50, in which the low temperature heat carrier 44 is directed from the at least one sorption module 18 back to the low temperature source 16.

The temperature of the low temperature heat source 16 lies below the ambient temperature and serves for the cooling, for example, of vehicles, buildings or a refrigerator or similar. When something is cooled by means of the low temperature heat carrier 44, this is heated in the low temperature heat source 16, hence the designation "source".

In the case of a heat pump application, the low temperature heat source 16 can also be formed by the environment in the form of external air, geothermal heat or solar heat, the heat of which is received at low temperature and is emitted via the medium temperature circuit 14 at a higher heating temperature level for heating a room or a building. In this case, the high temperature heat source 12 is produced by a combustion process of a chemical energy carrier, the thermal energy of which is likewise used for heating at the temperature level of the medium temperature circuit 14.

The sorption modules 18 have a first flow channel 52, which is in thermal contact with the sorption zone 20, in particular with the sorption means 22. Thereby, a heat carrier, which flows through the first flow channel 52, can control the temperature of the sorption means. Furthermore, the sorption modules 18 have a second flow channel 54, which is in thermal contact with the phase change zone 24, so that the phase change zone 24 can be temperature-controlled by a heat carrier which flows through the second flow channel 54.

Figure 2:
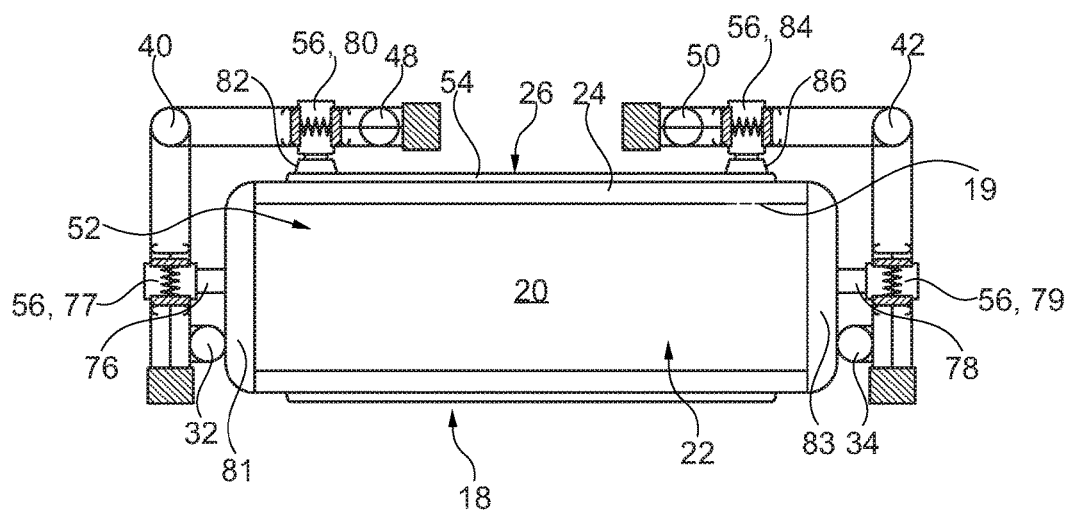
FIG. 2 illustrates a schematic diagram of a sorption module of the adsorption heat pump.
Figure 3:
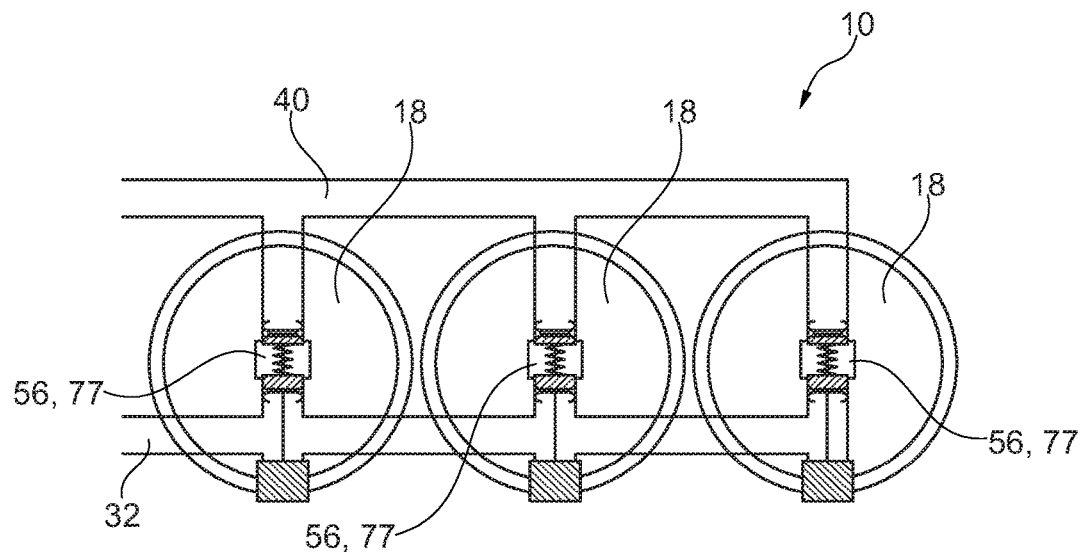
FIG. 3 illustrates an example arrangement of three sorption modules.

For each sorption module 18, the adsorption heat pump 10, as illustrated by way of example in FIG. 2, has a plurality of valves 56, for example four, therefore a first valve 77, a second valve 79, a third valve 80 and a fourth valve 84. With the valves 56, the two flow channels 52, 54 are connected to the circuits 30, 38 and 46.

Figure 5:
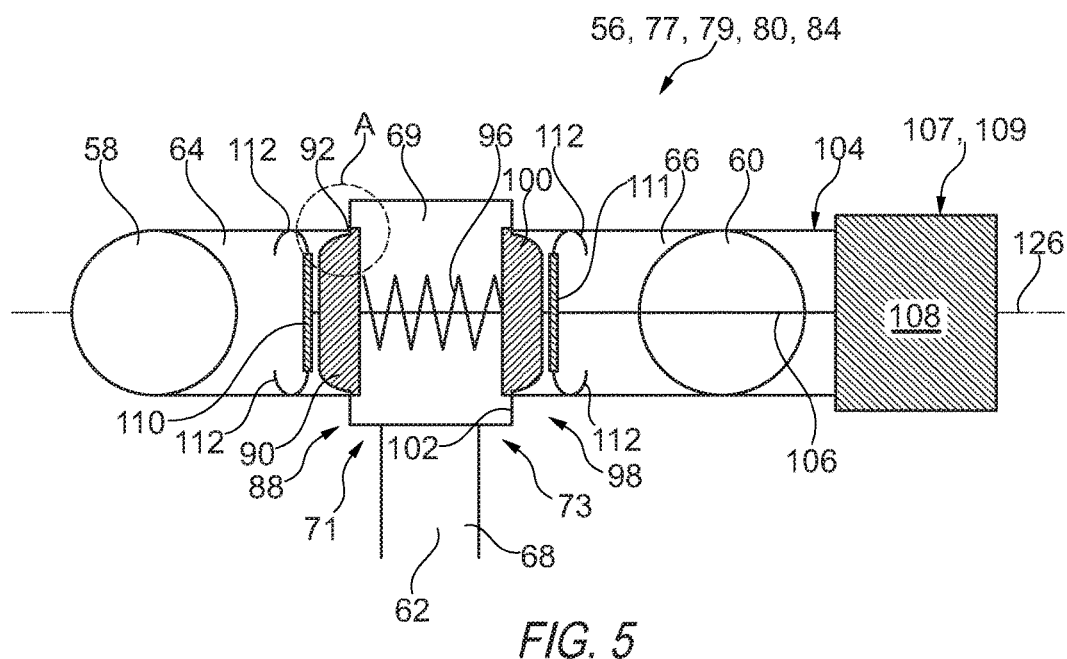
FIG. 5 illustrates a basic sectional illustration through a valve according to the invention.
Figures 6A, 6B, 6D:
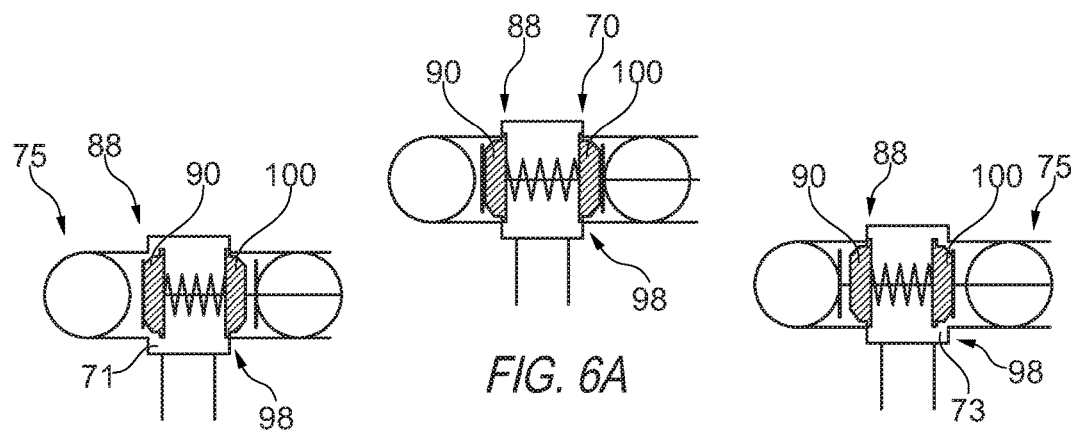
FIG. 6A through 6E illustrate different positions in which a valve according to the invention can be situated.
Figures 6C, 6E:

The valves 56, as illustrated for example in FIG. 5, have respectively a first connection 58, a second connection 60 and a third connection 62. A first channel 64 extends from the first connection 58, a second channel 66 extends from the second connection 60, and a third channel 68 extends from the third connection 62. The three channels 64, 66 and 68 open in a central chamber 69, via which a fluidic connection between the three channels is produced or is able to be produced.

The valves 56 make possible a plurality of switching positions, as are illustrated by way of example in FIG. 6A through 6E. In a closure position 70, the first channel 64 and the second channel 66 are closed, so that no fluidic connection is present between the individual channels. In a first open position 72, the first channel 64 is open and the second channel 66 is closed, so that a first fluidic connection 71 exists between the first channel 64 and the third channel 68. In a second open position 74, the second channel 66 is open and the first channel 64 is closed, so that a second fluidic connection 73 exists between the second channel 66 and the third channel 68. Furthermore, the valves 56 have at least one intermediate position 75, in which the first channel 64 or the second channel 66 is partially open. Thereby, a throttled fluidic connection exists between the first channel 64 and the third channel 68 or between the second channel 66 and the third channel 68.

Via the first valve 77 of the valves 56 an inlet 76 of the first flow channel 52 is connected to the high temperature supply 32 and the medium temperature feed 40. Here, the third connection 62 is connected to the inlet 76 of the first flow channel 52, so that the third channel 68 of the first valve 77 is fluidically connected to the inlet 76 of the first flow channel 52. The first connection 58 is connected to the high temperature feed 32, and the second connection 60 is connected to the medium temperature feed 40. Thereby, the first flow channel 52 of the sorption module 18 can be switched over between the high temperature feed 32 and the medium temperature feed 40 and thereby a heating phase and a cooling phase can be switched over.

In the desorption phase, in which the sorption means 22 is to be heated, a fluidic connection is produced between the inlet of the first flow channel 52 and the high temperature feed 32. In the adsorption phase, the first valve is switched such that a fluidic connection is produced between the first flow channel 52 and the medium temperature feed 40, so that the sorption means 22 can be cooled by the medium temperature heat carrier 36.

An outlet 78 of the first flow channel 52 is connected via the second valve 79 of the valves 56 to the high temperature return 34 and the medium temperature return 42. Here, the third connection 62 of the second valve 79 is connected to the outlet 78 of the first flow channel 52, and the first connection 58 of the second valve 79 is connected to the high temperature return 34, and the second connection 60 of the second valve 79 is connected to the medium temperature return 42. This second valve 79 is switched in accordance with the first valve 77 in the desorption phase to the high temperature return 34 and in the adsorption phase to the medium temperature return 42.

Furthermore, the adsorption heat pump 10 has for each sorption module 18 the third valve 80, which connects an inlet 82 of the second flow channel 54 to the medium temperature feed 40 and to the low temperature feed 48. In a condensation phase, in which the working medium 26 condenses in the phase change zone 24, the third valve 80 is switched such that a fluidic connection exists between the second flow channel 54 and the medium temperature feed 40. Thus, the phase change zone 24 can be cooled by the medium temperature heat carrier 36. In a vaporization phase, the third valve 80 is switched such that a fluidic connection exists between the second flow channel 54 and the low temperature feed 48. Thereby, in the vaporization phase, the working medium 26 vaporizing in the phase change zone 24 can receive heat from the low temperature heat carrier 44 and thereby cool it.

In addition, the adsorption heat pump has for each sorption module the fourth valve 84, which connects an outlet 86 of the second flow channel 54 to the medium temperature return 42 and to the low temperature return 50. In accordance with the third valve 80, the fourth valve 84 in the condensation phase switches a fluidic connection between the second flow channel 54 and the medium temperature return 42, and in the vaporization phase a fluidic connection between the second flow channel 54 and the low temperature return 50.

During operation of the adsorption heat pump 10, the sorption modules 18 are operated cyclically. The desorption phase and the adsorption phase alternate. In the adsorption phase, the first valve 77 and the second valve 79 are switched such that the sorption zone 20 is cooled by the medium temperature heat carrier 36. Thereby, the sorption means 22 can adsorb the working medium 26, whereby the pressure within the sorption module 18 is reduced. Thereby, the liquid working medium 26, localized in the phase change zone 24, can vaporize, whereby the working medium 26 can receive thermal energy. Thereby, the phase change zone 24 is cooled. Through the cooling of the phase change zone, thermal energy can be accordingly received from the low temperature heat carrier 44, whereby the latter is cooled.

For this, in the vaporization phase the third valve 80 and the fourth valve 84 are switched such that the low temperature heat carrier 44 flows through the second flow channel 54 and thereby is in thermal contact with the phase change zone 24. The adsorption phase takes place accordingly substantially simultaneously with the vaporization phase, in which the desired effect, namely of the cooling of the low temperature heat carrier 44, is achieved. This phase is also named the useful phase.

In a regeneration phase, on the other hand, the sorption zone 20 is heated, so that the desorption phase of the sorption zone 20 is initiated. This is achieved in that the first valve 77 and the second valve 79 are switched such that the high temperature heat carrier 28 flows through the first flow channel 52 and therefore is in thermal contact with the sorption means 22 and can heat the latter. Thereby, the sorption means 22 delivers the working medium 26, so that the pressure in the sorption module 18 rises and therefore the working medium 26 can condense.

In order to condense the working medium 26 in the phase change zone 24, in the thereby initiated condensation phase, the third valve 80 and the fourth valve 84 are switched such that the medium temperature heat carrier 36 flows through the second flow channel 54 and is therefore in thermal contact with the phase change zone 24 and can cool this. Thereby, it can be achieved that the working medium 26 condenses in the phase change zone 24 and is available there in the useful phase for vaporization.

On a changeover from the regeneration phase to the useful phase and vice versa, the sorption zone 20 must be brought from the desorption phase into the adsorption phase or vice versa, and the phase change zone 24 from the condensation phase to the vaporization phase or vice versa. These are distinguished respectively by a considerable temperature difference, so that through a simple simultaneous switching over of the respectively corresponding valves 77 and 79 and 80 and 84 between the regeneration phase and the useful phase as a result of the sensitive heat capacities, considerable amounts of heat are diverted into the respectively complementary circuit. Thereby, in particular, high temperature heat is lost from the high temperature heat source 12 to the medium temperature heat sink 14 and from the latter to the low temperature heat source 16.

In order to reduce the respective heat losses, during the transition between the regeneration phase and the useful phase and vice versa, so-called cross-connections are set, in which for example the first flow channel 52 is connected at the inlet side to the high temperature feed 32 and at the outlet side to the medium temperature return 42. Thereby, on a changeover between the phases, the unproductive diversion of heat from a circuit of higher temperature into a circuit of lower temperature can be reduced.

On the changeover from the adsorption phase to the desorption phase, the high temperature heat carrier 28 heats the sorption zone 20. Thereby, the high temperature heat carrier 28 cools down. This lost heat must be applied, but does not bring about any thermal pumping output. Consequently the efficiency is thereby reduced.

Figure 4:
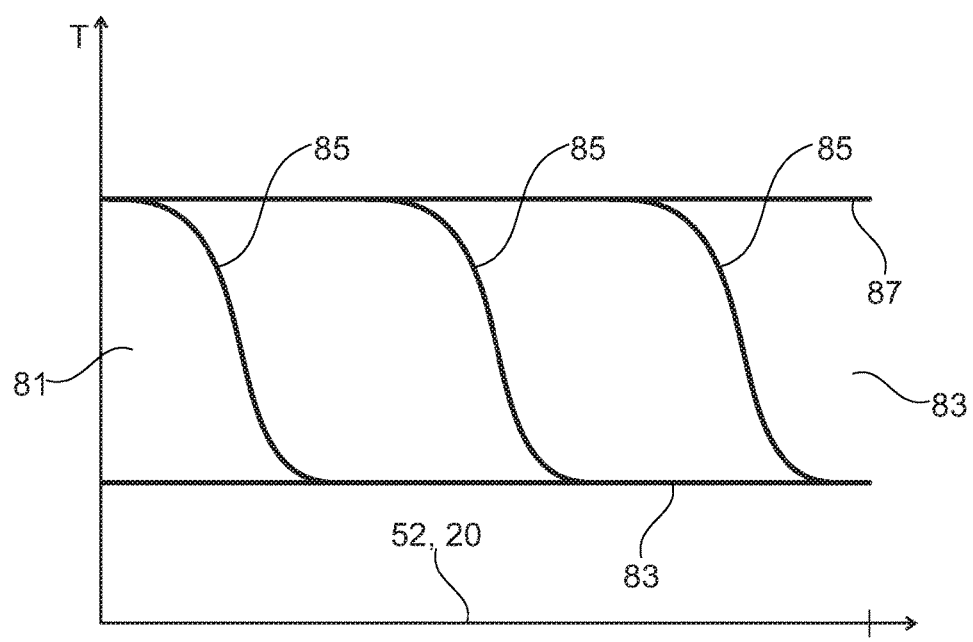
FIG. 4 illustrates a temperature profile in the sorption phase, in the adsorption phase, in the desorption phase and on a change from the adsorption phase to the desorption phase.

When the high temperature heat carrier 28 flows slowly through the first flow channel 52, the high temperature heat carrier cools down approximately to the temperature of the sorption zone 20, namely the temperature of the medium temperature heat carrier 36. In the sorption zone 20, a temperature gradient 85 then forms, wherein on the inlet side the temperature can be at the temperature 87 of the high temperature heat carrier 28 and on the outlet side the temperature of the sorption zone 20 can be at the temperature 89 of the medium temperature heat carrier 36, as is shown for example in FIG. 4. During the temperature change phase, the temperature gradient 85 shifts from an inlet side 81 of the sorption zone 20 up to an outlet side 83 of the sorption zone 20, so that during almost the entire temperature change phase from adsorption to desorption, the high temperature heat carrier 28, which emerges from the first flow channel 52, has the temperature 89 of the medium temperature heat carrier 36. Thereby, it is expedient to return the high temperature heat carrier 28, cooled in the sorption zone 20, into the medium temperature circuit 38 instead of into the high temperature circuit 30.

Accordingly, on a changeover form the desorption phase to the adsorption phase, therefore on a cooling of the sorption zone 20, the heat which is stored in the sorption module 18 can be returned through a corresponding cross-connection into the high temperature circuit 30. Thereby, the thermal energy which was withdrawn from the high temperature circuit 30 during the heating of the sorption zone 20, is returned again during cooling of the sorption zone 20. Consequently, the harmful diverting of heat during the temperature changeovers can therefore be reduced.

This effect can be utilized particularly efficiently when during a temperature change phase the heat carrier flows only in a throttled manner through the first flow channel 52.

Through these cross-connections, volume flows are shifted to and from the high temperature circuit 30 to the medium temperature circuit 38 and vice versa. For this, for example, compensating reservoirs can come into use, which permit a temporary mass displacement between two circuits. Over one cycle, however, the displacements balance out. Furthermore, when a plurality of sorption modules are used, these are usually used in a phase-shifted manner, so that the displacement of the heat carriers between the circuits also balances out at any moment. This is the case in particular when the cross-connection phases of two modules, which are switched over in a complementary manner, take place simultaneously, for an equal length and with the same volume flow. In practice, several of these provisions can also be combined.

Through a corresponding connecting of the third valve 80 and fourth valve 84, heat can also be recovered from the phase change zone 24 at the temperature changeovers. As the phase change zone 24 is also heated or cooled by the phase change of the working medium 26, only a small portion of the heat can be recovered. The greater the heat output through the phase change compared to the heating output through the heat carrier, the less heat can be recovered. Therefore, a greater flow speed of the heat carriers would be expedient. However, with too great a flow speed, the heat carrier can not fully assume the temperature of the phase change zone. Consequently, a compromise must be found, in which the flow speed of the heat carrier delivers the best result. Finely incrementable intermediate positions of the valves 56 are therefore advantageous.

The valves 56 have a first valve unit 88, with which the first channel 64 can be opened and closed. Thereby, the first valve unit 88 can control a fluidic connection between the first channel 64 and the third channel 68, so that a fluidic connection between the first connection 58 and the third connection 62 can also be controlled by the first valve unit 88. The first valve unit 88 has a first valve body 90 and a first valve seat 92. When the first valve body 90 is pressed into the first valve seat 92, the first valve body 90 closes the opening formed by the first valve seat 92 and therefore closes the first channel 64. When the first valve body 90 is raised from the first valve seat 92, an annular gap 94 forms between the first valve body 90 and the first valve seat 92, through which a fluid can flow. The valves 56 have respectively a spring element 96, which acts upon the first valve body 90 with a closing force which presses the first valve body 90 into the first valve seat 92.

In addition, the valves 56 have a second valve unit 98 with a second valve body 100 and a second valve seat 102. The second valve unit 98 is designed in accordance with the first valve unit 88 such that it can open and close the second channel 66 of the valves 56. The second valve seat 102 surrounds the flow cross-section of the second channel 66. When the second valve body 100 is pressed into the second valve seat 102, the second valve body 100 closes an opening formed by the second valve seat 102 and therefore also closes the second channel 66.

The second valve unit 98 can accordingly open and close the second channel 66. Thereby, the second valve unit 98 can control a fluidic connection between the third channel 68 and the second channel 66. Accordingly, a fluidic connection between the second connection 60 and the third connection 62 is controlled by the second valve unit 98.

The spring element 96 of the valves 56 also acts upon the second valve body 100 with a closing force which presses the second valve body 100 in the direction of the second valve seat 102.

The spring element 96 is arranged between the first valve body 90 and the second valve body 100, so that the spring element 96 can press both the first valve body 90 and also the second valve body 100 into the respective associated valve seat 92, 102, in order to close the respective valve units 88 and 98. Accordingly, the two valve units 88 and 98 are arranged lying opposite one another, so that the spring element 96 arranged between the first valve body 90 and the second valve body 100 can respectively exert a closing force on the valve bodies. The opening directions of the two valve units 88, 98 are accordingly in opposition.

The valves 56 have respectively an actuating drive 104 with a control rod 106 and with a drive 108, which drives the control rod 106. The control rod 106 engages through the first valve body 90 and the second valve body 100 and is mounted in a sliding manner in axial direction in the first valve body 90 and in the second valve body 100. In addition, the actuating drive 104 has a first carrier element 110 and a second carrier element 111, which are held securely on the control rod 106 and are arranged such that, between the two carrier elements 110, 111, the first valve body 90, the spring element 96 and the second valve body 100 are arranged.

The carrier elements 110, 111 have such a radial extent that, when the control rod 106 is displaced in axial direction, the first valve body 90 is raised by the first carrier element 110, or the second valve body 100 by the second carrier element 111, from the respective valve seat 92 or 102, and thereby accordingly the first channel 64 or the second channel 66 is opened.

The drive 108 is designed such that a holding moment, without power, of the drive 108 is sufficient in order to overcome the closing forces of the spring element 96, so that the actuating drive 104 can hold the first or the second valve unit 88, 98 in a position in which the first valve body 90 or the second valve body 100 is raised from the respective valve seat 92, 102. Thereby, the valve 56 can pause in an open position, therefore in a position in which either the first channel 64 or the second channel 66 is open, without consuming energy. This enables an energy-efficient control of the adsorption heat pump, whereby overall the efficiency of the adsorption heat pump is improved.

Accordingly, intermediate positions, in which the valve bodies 90, 100 are only partially raised from the respective valve seat 92, 102, can also be held in the position without power.

The drive 108 has, for example, a stepping motor 107 which, due to the type of construction, has a certain holding moment. By selection of a corresponding gear unit 109, in particular of the transmission of the gear unit 109, a holding moment of the actuating drive 104 can thereby be achieved, which is sufficient in order to hold the valve units in all positions without power, in particular in a currentless manner.

In addition, a gear unit can also be selected which is self-inhibiting. Thereby, likewise, the position of the valve units 88, 98 can not be altered by the spring force of the spring element 96 or compressive forces which act on the valve bodies 90, 100.

The force which the actuating drive 104 can exert is greater than the closing force exerted by the spring element 96 in addition to compressive forces caused by pressure differences between the third channel 68 and the first channel 64 or the second channel 66.

In addition, the actuating drive 104 has centering elements 112, which center the control rod 106 and thereby also the first valve body 90 and the second valve body 100, so that a precise positioning of the valve bodies 90, 100 to the respective valve seats 92, 102 is provided.

The centering elements 112 can be formed, for example, by spring lugs. In particular these spring lugs are arranged on the carrier elements 110, 111.

The two valve units 88 and 98 have respectively a valve opening characteristic 114, which defines a flow coefficient 116 of the respective valve unit depending on an adjustment path 118. The adjustment path 118 corresponds to the deflection of the respective valve bodies 90, 100 out from the respective valve seat 92, 102. The flow coefficient $k_v$ is provided by the following formula:

$$k_v = Q(\rho/\Delta p)^{1/2},$$

wherein Q is the effective area with the regard to flow of the respective valve unit, $\rho$ is the density of the fluid, and $\Delta p$ is the pressure gradient applying at the valve unit. The effective area with regard to flow takes into account here both the flow cross-section and also other geometric characteristics influencing flow.

Preferably, the two valve units 88, 98 and hence the valves 56 have a valve opening characteristic 114, which is not linear. In particular, the valve opening characteristic 114 has varying gradients.

In regions in which the valve opening characteristic 114 has a small gradient, therefore is flat, the flow coefficient 116 alters only slightly on a change of the adjustment path 118, compared to regions in which the valve opening characteristic 114 has a greater gradient and is therefore steeper.

By selection of the course of the valve opening characteristic 114, regions can therefore be reached in which the flow coefficient 116 can be adjusted particularly precisely.

Figure 7:
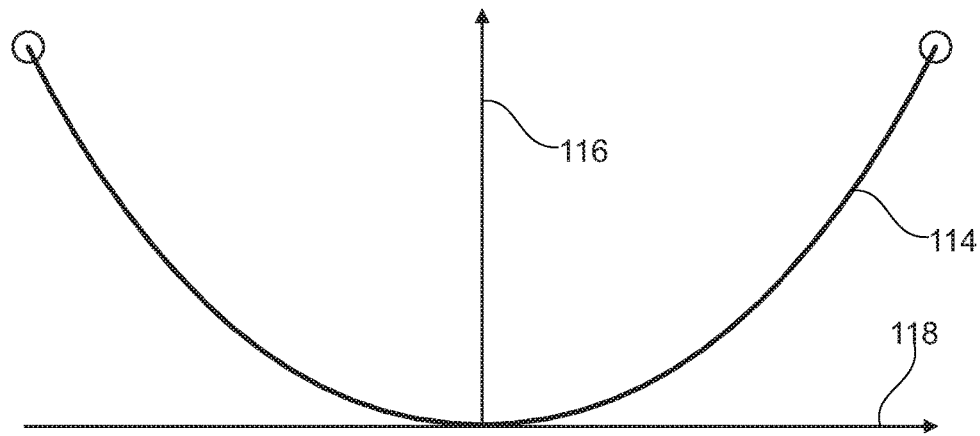
FIG. 7 illustrates a valve opening characteristic with a progressive course.
Figures 8A, 8B, 8C:
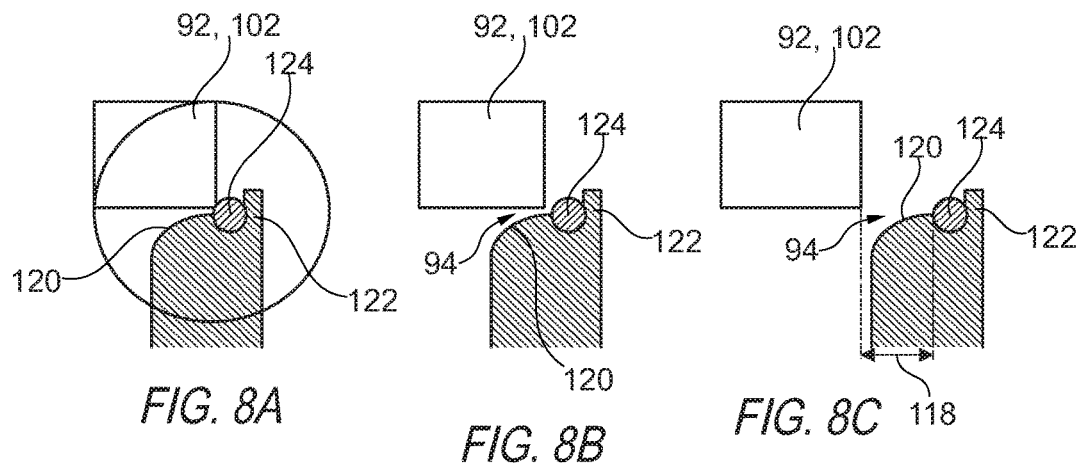
FIG. 8A through 8C illustrate an enlarged illustration of the region A of FIG. 5 with three different positions of a valve unit of the valve.
Figures 9A, 9B:
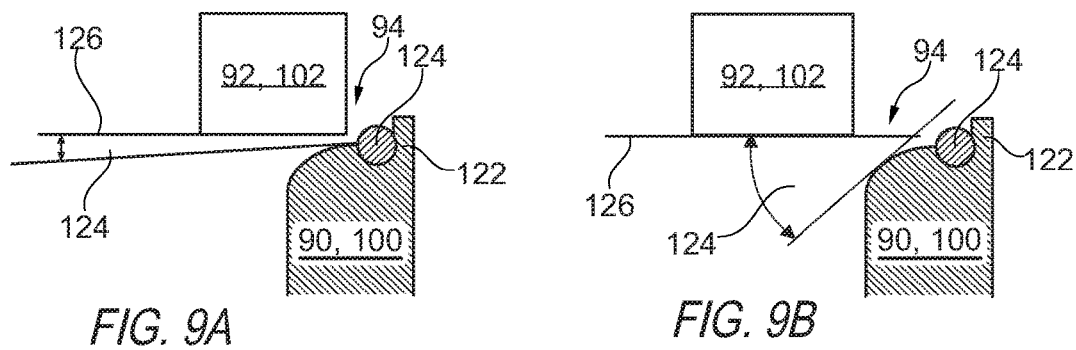
FIGS. 9A and 9B illustrate an enlarged illustration of the region A of FIG. 5 to clarify the course of the valve surface.

In FIG. 7 for example a progressive valve opening characteristic 114 is illustrated. With small adjustment paths 118 and hence with small flow coefficients 116, the valve opening characteristic 114 is flat, so that over the adjustment path 118 and hence by the actuating drive 104 the flow coefficient 116 of the valve can be adjusted very precisely. This is advantageous in particular in the temperature change phases in which the flow speed of the respective heat carrier is to be small and is to be able to be adjusted as precisely as possible. In the region of high flow coefficients 116, the valve opening characteristic 114 is steeper. Thereby, the flow coefficient 116 can indeed no longer be adjusted so precisely, instead the required adjustment path 118 reduces in order to fully open the valve 56 or respectively the respective valve unit 88, 98.

The shape, in particular the course of the valve opening characteristic 114 is provided by the geometry of the valve bodies and of the valve seats. In particular, the course or the shape of a valve surface 120 of the valve bodies 90, 100 is relevant for the course of the valve opening characteristic 114. The valve bodies 90, 100 have respectively a rim 122, with which the valve bodies 90, 100 lie against the respective valve seats 92, 102 and thereby seal the opening. A seal 124 may possibly be provided, in order to improve the sealing effect.

Proceeding from the rim 122, the valve surface 120 extends axially in the closing direction of the respective valve unit and radially inwards. In particular, the valve surface 120 can be designed so as to be convex. The valve surface 120 projects into the valve seat 92, 102 in the respective valve unit, when the respective valve body 90, 100 lies in the valve seat.

When the valve body 90, 100 is partially raised out from the valve seat 92, 102, the annular gap 94 forms. The width of the annular gap is provided by the distance of the valve surface 120 to the respective valve seat 92, 102, in particular by the radial distance.

Through the fact that the valve surface 120 extends both in axial direction and also in radial direction inwards, the annular gap widens with an increasing adjustment path 118 of the respective valve bodies 90, 100 out from the valve seat 92, 102. The inclination of the valve surface 120, therefore an angle 127 to a valve axis 126, which corresponds substantially to an axis of the control rod 106 and also determines the direction of the adjustment path 118 of the two valve bodies 90, 100, determines the gradient of the valve opening characteristic 114. When the angle 127 of the valve surface 120 to the valve axis 126 is large, the gradient of the valve opening characteristic 114 is large. The gradient of the characteristic corresponds here approximately to the tangent of the angle 127 of the valve surface 120 to the valve axis 126.

If now the valve surface 120 is curved, for example convex, the valve surface 120 has an angle 127, varying in axial direction, to the valve axis 126. Thereby, the gradient of the valve opening characteristic 114 also varies depending on the adjustment path 118. Consequently, through adaption of the valve surface 120, the valve opening characteristic 114 can be adjusted.

In particular, the valve surface 120 has in the vicinity of the rim 122 a small angle 127 to the valve axis 126. This region is relevant for the valve opening characteristic 114, with small adjustment paths 118 of the respective valve body 90, 100 from the respective valve seat 92, 102. In regions which have a greater distance to the rim 122, the valve surface 120 has a greater angle 127 to the valve axis 126, so that with greater adjustment paths 118 the gradient of the valve opening characteristic 114 becomes greater.

Figure 10:
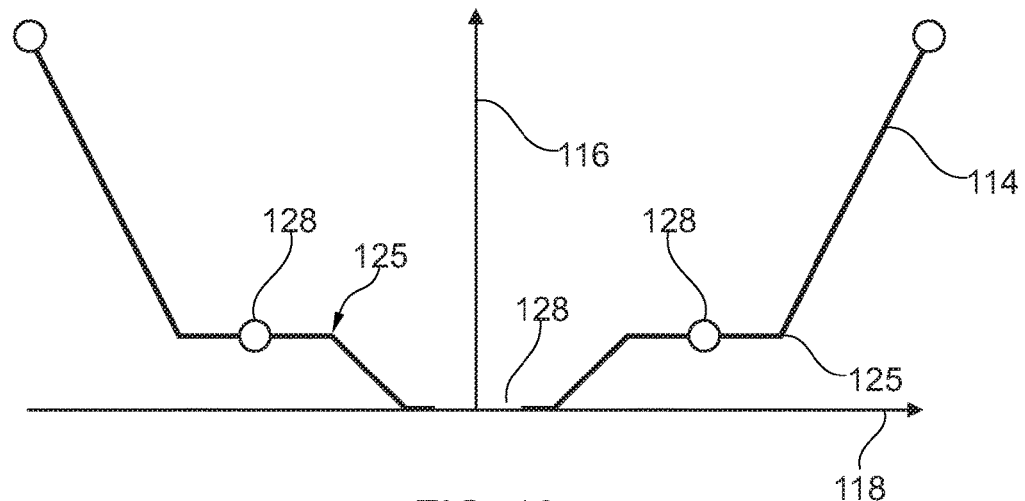
FIG. 10 illustrates a valve opening characteristic of a valve with a step.
Figure 11A:
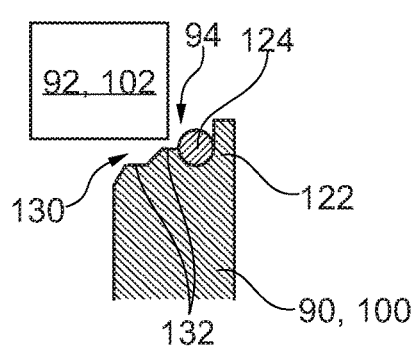
FIGS. 11A and 11B illustrate an enlarged illustration of the region A in a different embodiment of the valve with a step-shaped characteristic, as is illustrated in FIG. 10.
Figure 11B:
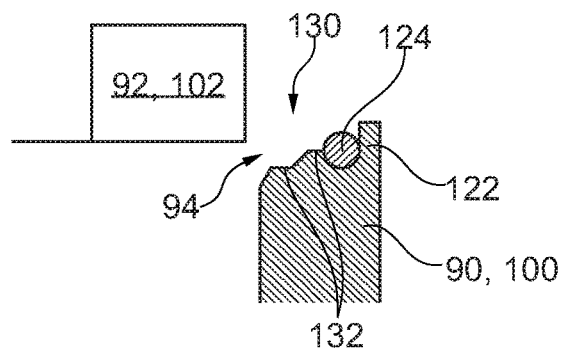

In another variant of the valves 56, as are illustrated for example in FIGS. 10, 11A and 11B, the valve opening characteristic 114 has steps 125, in particular a plateau region 128.

This can be expedient for example when a previously known defined flow coefficient 116 is to be reliably adjusted. By the plateau 128 a wide region is produced for the adjustment part 118, in which the desired flow coefficient 116 of the valve 56 is achieved. This can be achieved in that the valve bodies 90, 100 have a valve surface 120 with steps 130. In particular, the valve surfaces 120 have a region 132, in which the angle 127 to the valve axis 126 is very small, in particular 0°. Alternatively, provision can also be made to adjust a negative angle 127, in order to achieve as flat a plateau 128 as possible.

Otherwise, this variant coincides with the previously described variant.

The invention claimed is:

1. A valve for an adsorption heat pump comprising:
   a first channel, a second channel, and a third channel;
   a first valve unit including a first valve body and a first valve seat, wherein the first valve unit is structured and arranged to open and close the first channel;
   a second valve unit including a second valve body and a second valve seat, wherein the second valve unit is structured and arranged to open and close the second channel;
   a spring element pre-stressed between the first valve body and the second valve body, wherein the spring element is structured and arranged to provide a first closing force upon the first valve body in a first direction of the first valve seat, and a second closing force upon the second valve body in a second direction of the second valve seat;
   an actuating drive having a control rod, wherein the control rod extends through the first valve body and the second valve body;
   a first carrier element and a second carrier element each secured to the control rod, wherein the first valve body, the second valve body, and the spring element are arranged between the first carrier element and the second carrier element;
   wherein the valve is structured to adjust to a closed position, a first open position, a second open position, and at least one intermediate position;
   wherein in the closed position, the first valve unit and the second valve unit are closed;
   wherein in the first open position, the first valve unit is fully open;
   wherein in the second open position, the second valve unit is fully open;
   wherein in the at least one intermediate position, one of the first valve unit and the second valve unit is partially open;
   wherein the actuating drive is structured and arranged to hold the valve in the closed position, the first open position, the second open position, and the at least one intermediate position without power;
   wherein the actuating drive includes a stepping motor and a gear unit, wherein the stepping motor and the gear unit are structured and arranged to hold the valve in the closed position, the first open position, the second open position, and the at least one intermediate position via a currentless holding moment;
   wherein the first valve unit and the second valve unit have a non-linear valve opening characteristic defining a flow coefficient that is dependent on an adjustment path; and
   wherein the non-linear valve opening characteristic includes at least one flat region.

2. The valve according to claim 1, wherein the actuating drive includes a stepping motor linear drive.

3. The valve according to claim 1, wherein the actuating drive includes a plurality of centering elements constructed and arranged to center the control rod within the first valve body and the second valve body.

4. The valve according to claim 3, wherein the plurality of centering elements include a plurality of spring lugs arranged on the first carrier element and the second carrier element.

5. The valve according to claim 3, wherein the plurality of centering elements further center at least one of the first valve body and the second valve body.

6. The valve according to claim 1, wherein the non-linear valve opening characteristic includes a gradient varying over the adjustment path.

7. The valve according to claim 6, wherein the gradient of the non-linear valve opening characteristic rises when the adjustment path rises.

8. The valve according to claim 1, wherein:
   at least one of the first valve body and the second valve body includes a valve surface;
   the valve surface extends at an angle in relation to a respective valve axis of the at least one of the first valve body and the second valve body; and
   the angle varies in an axial direction of the respective valve axis.

9. The valve according to claim 1, wherein the first channel, the second channel, and the third channel each open into a central chamber.

10. An adsorption heat pump with a valve according to claim 1, wherein the valve is structured and arranged to switch between a high temperature heat carrier and a medium temperature heat carrier.

11. The valve according to claim 1, wherein the first carrier element and the second carrier element extend radially outward from the control rod.

12. The valve according to claim 1, wherein the flat region is a step.

13. The valve according to claim 1, wherein the currentless holding moment is greater than i) a combination of the first closing force of the spring element and a pressure differential force acting on the first valve body, and ii) a combination of the second closing force of the spring element and a pressure differential force acting on the second valve body, such that the stepping motor and the gear unit maintain a position of the first valve unit and a position of the second valve unit without power.

14. The valve according to claim 1, wherein:
   the control rod extends through the first valve body and the second valve body in an axially adjustable manner with respect to the first valve body and the second valve body;
   the first carrier element and the second carrier element extend radially outward from the control rod;
   the first carrier element contacts the first valve body and lifts the first valve body from the first valve seat opening the first channel, the second carrier element is adjusted axially away from the second valve body, and the second valve body remains seated in the second valve seat closing the second channel when the control rod is adjusted in a first axial direction; and the second carrier element contacts the second valve body and lifts the second valve body from the second valve seat opening the second channel, the first carrier element is adjusted axially away from the first valve body, and the first valve body remains seated in the first valve seat closing the first channel when the control rod is adjusted in a second axial direction.

15. A valve for an adsorption heat pump comprising:

a first channel, a second channel, and a third channel, and wherein the first channel, the second channel, and the third channel each open into a central chamber;

a first valve unit including a first valve body and a first valve seat, wherein the first valve unit is structured and arranged to open and close the first channel;

a second valve unit including a second valve body and a second valve seat, wherein the second valve unit is structured and arranged to open and close the second channel;

wherein at least one of the first valve body and the second valve body includes a valve surface, and wherein the valve surface extends at an angle in relation to a respective valve axis of the at least one of the first valve body and the second valve body and varies in an axial direction;

a spring element pre-stressed between the first valve body and the second valve body, wherein the spring element is structured and arranged to provide a first closing force upon the first valve body in a first direction of the first valve seat, and a second closing force upon the second valve body in a second direction of the second valve seat;

an actuating drive having a control rod, wherein the control rod extends through the first valve body and the second valve body, and wherein the actuating drive includes a plurality of centering elements structured and arranged to center the control rod within the first valve body and the second valve body;

a first carrier element and a second carrier element each secured to the control rod, wherein the first valve body, the second valve body, and the spring element are arranged between the first carrier element and the second carrier element;

wherein the valve is constructed and arranged to move between a closed position, a first open position, a second open position, and at least one intermediate position;

wherein in the closed position, the first valve unit and the second valve unit are closed;

wherein in the first open position, the first valve unit is fully open;

wherein in the second open position, the second valve unit is fully open;

wherein in the at least one intermediate position, one of the first valve unit and the second valve unit is partially open;

wherein the actuating drive is structured and arranged to hold the valve in the closed position, the first open position, the second open position, and the at least one intermediate position without power; and wherein the actuating drive includes a stepping motor and a gear unit, wherein the stepping motor and the gear unit are structured and arranged to hold the valve in the closed position, the first open position, the second open position, and the at least one intermediate position via a currentless holding moment.

16. The valve according to claim 15, wherein the plurality of centering elements further center at least one of the first valve body and the second valve body.

17. The valve according to claim 15, wherein the plurality of centering elements include a plurality of spring lugs arranged on the first carrier element and the second carrier element.

18. The valve according to claim 15, wherein the first valve unit and the second valve unit have a valve opening characteristic defining a flow coefficient that is dependent on an adjustment path, and wherein the valve opening characteristic is non-linear and includes at least one flat region.

19. The valve according to claim 18, wherein the valve opening characteristic includes a gradient varying over the adjustment path.

20. The valve according to claim 18, wherein the flat region is a step.

* * * * *